Feb. 16, 1960

I. W. COX 2,925,540

ELECTROMAGNETIC DEVICE

Filed Dec. 5, 1956

Inventor
Irvin W. Cox
By H R Rather
Attorney

United States Patent Office 2,925,540
Patented Feb. 16, 1960

2,925,540
ELECTROMAGNETIC DEVICE

Irvin W. Cox, West Allis, Wis., assignor to Cutler-Hammer, Inc., Milwaukee, Wis., a corporation of Delaware Application December 5, 1956, Serial No. 626,471

2 Claims. (Cl. 317—156)

This invention relates to improvements in electro-magnetic devices.

While not limited thereto, the invention is especially applicable to alternating current relays employed in control systems of aircraft and the like where good quality of performance and low noise are required.

Various expedients have been proposed to eliminate undesirable variations in magnetic attraction in alternating current relays due to the cyclic variation of an alternating current characteristic to maintain stability of an armature position throughout such variations. Because of the lack of uniformity of pull caused by a cyclic variation of voltage, an undesired or false response of the relay may occur. This is especially true where a high degree of sensitivity is required or where the relay is subject to shock in its usual operation. Also the lack of uniformity in attraction of the armature due to the cyclic variation of the current or voltage results in objectionable hum or noise and undesirable wear of the parts. Among other things, it has been proposed to employ a shading coil in inductive relation to the energizing coil to afford a phase displacement of the alternating current induced in the former relative to that of the latter. It should be apparent that such phase displacement affords a resultant attractive flux having an absolute value that is maintained above zero value at all times throughout the cyclic variations of the alternating current. However, the power consumed by a shading coil is directly proportional to the frequency of the alternating current applied to the energizing coil. Therefore, although a shading coil type device can be economically operated at the lower frequencies, the power consumption becomes so large at the higher frequencies, such as 400 cycles used in aircraft systems, as to render a shading coil impractical. This is readily apparent when it is considered that the total watts consumed by a shading coil type device at 400 cycles, for example, is approximately seven times that consumed at 60 cycles under similar operating conditions. Another disadvantage of the shading coil type device resides in its inability to afford a 90 degree phase displacement between the fluxes. The inductive reactance and resistance of the shading coil limit the phase displacement to approximately 70 degrees and, therefore, the magnetic pull is not constant.

It has also been proposed to employ a pair of coils, one of the coils being energized directly from an alternating current supply source and the other coil having a phase-shifting capacitor and a resistor in series connection therewith and the supply source to obtain a phase displacement therebetween. When two coils are used, the optimum phase displacement is 90 degrees, although a small variation therefrom is not unsatisfactory. While the aforementioned arrangement affords a substantially constant total magnetic pull, the point of application of the force components shifts between portions of the armature corresponding to the axes of the respective coils.

In alternating current relays operating at higher frequencies the problems attendant on non-uniformity of pull, noise, power consumption and undesirable wear become especially pronounced. Although the power consumption of a shading coil type device remains within acceptable limits at the lower frequencies and up to approximately 180 cycles where it equals that of a capacitor type device, at frequencies above 180 cycles and up to approximately 1,000 cycles the latter type is preferred. Since inrush of current is a function of frequency, the volt-amperes at an open condition of the armature might be so great as to affect the stability of the supply source at frequencies above 1,000 cycles. Additionally, noise of a given amplitude which may be tolerable to a human ear at the lower frequencies becomes objectionable at higher frequencies.

Therefore, it is desirable to provide an alternating current electromagnet having a long operational life and wherein the cyclic variations of the current or voltage do not materially affect the stability of the armature position. It is also desirable to reduce the hum and noise to a minimum and to afford greater holding power in the sealed position of the armature without a corresponding increase in its size and cost.

Accordingly, an object of the invention is to provide improved means affording the aforementioned and other functions.

A more specific object of the invention is to provide an improved alternating current electromagnetic device operable at approximately 180 to 1,000 cycles with a minimum of noise wherein stability of armature position throughout cyclic variations of alternating current is simply and economically attained without extraneous elements such as shading coils and the like.

A still more specific object of the invention is to provide such electromagnetic device with improved means affording substantially greater holding power in the sealed position of the armature.

A further specific object of the invention is to provide an improved alternating current electromagnetic device having a plurality of force components at the same length of lever arm.

Other objects and advantages of the invention will hereinafter appear.

While the device hereinafter described is effectively adapted to fulfill the objects stated, it is to be understood that I do not intend to confine my invention to the particular preferred embodiment of electromagnetic device disclosed, inasmuch as it is susceptible of various modifications without departing from the scope of the appended claims.

Figure 1:
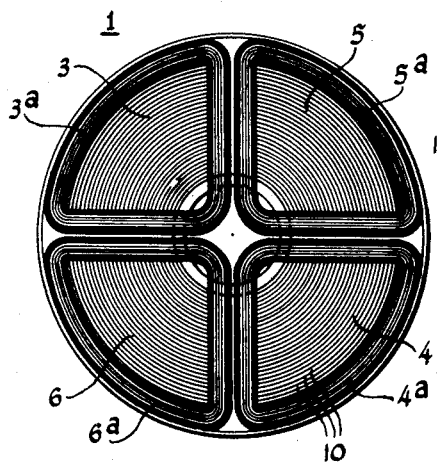
Figure 1 is an end view of an electromagnetic device constructed in accordance with the present invention.
Figure 2:
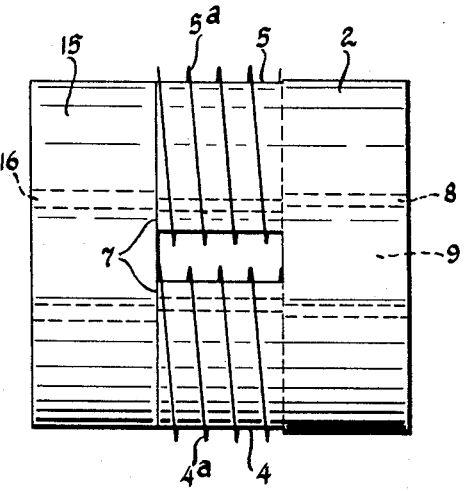
Fig. 2 is a side elevation view of the device of Fig. 1 and an armature.

Referring to Figs. 1 and 2 there is shown a cylindrical electromagnetic device indicated generally at 1 having a cylindrical core 2 having integrally formed at one end thereof four angularly spaced pole pieces 3, 4, 5 and 6. Surrounding the respective pole pieces are four preformed operating coils $3^a$, $4^a$, $5^a$ and $6^a$ for introducing magnetic fields adjacent pole faces 7. Core 2 is constructed by winding a ribbon-like strip of magnetic material onto an arbor 8 having an axial bore 9 therethrough to produce a cylindrical core having a plurality of spirally wound thin laminations 10 separated from one another by a thin insulating coating (not shown) previously applied to the lamination stock material. Coil slots are produced by milling in perpendicular directions across one end of the core to a desirable depth axially of the core. Arbor 8 may be left in the core, if desired, to provide support for the inner laminations and rigidity and compactness to the finished product. An electromagnet having the aforementioned cylindrical configuration is more suited than prior types to be enclosed in a container affording support for the laminations and facility for securing the same to a base.

Figure 3:
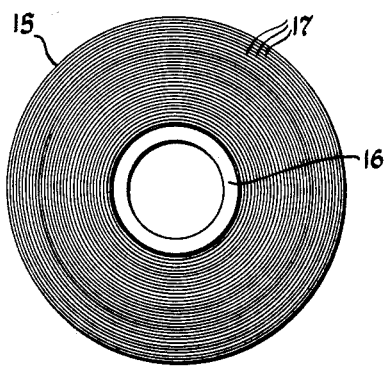
Fig. 3 is an end view of the armature shown in Fig. 2.

Referring to Figs. 2 and 3 there is shown an armature 15 in its closed or sealed position for cooperation with the electromagnetic device of Fig. 1. Armature 15 is similarly constructed by winding a ribbon-like strip of magnetic material onto an arbor 16 to produce a cylindrical armature having a plurality of spirally wound thin laminations 17 separated from one another by a thin insulating coating (not shown) previously applied to the lamination stock material.

Figure 4:
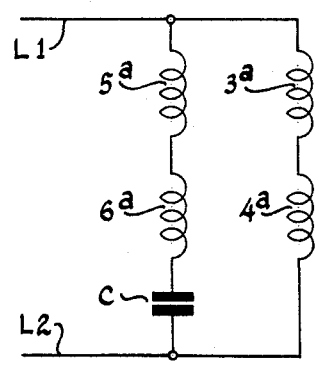
Fig. 4 shows diagrammatically an energizing circuit for the electromagnet of Fig. 1.

There is shown in Fig. 4 a circuit diagram for energizing the aforementioned operating coils 3ª, 4ª, 5ª and 6ª of the electromagnet of Fig. 1. It may be assumed that supply lines L1 and L2 are connected to an alternating current supply source (not shown) through suitable switches well known. Coils 3ª and 4ª which surround first oppositely disposed pole pieces 3 and 4, respectively, are connected across lines L1 and L2 to be energized in phase with the supply source. Coils 5ª and 6ª which surround second oppositely disposed pole pieces 5 and 6, respectively, are series connected with a phase shifting capacitor C across lines L1 and L2.

To obtain maximum quiet sealed magnetic attraction between magnet 1 and armature 15, the flux in two diametrically opposite pole pieces must be equal and displaced approximately 90 degrees in phase relative to the flux in the other two diametrically opposite pole pieces. The required phase displacement is obtained by suitably selecting the value of the aforementioned capacitor C in series connection with operating coils 5ª and 6ª. The improved split-phase electromagnet hereinbefore described operates with significantly less noise as one pair of like-phase coils is arranged transversely relative to the other pair of like-phase coils and the force components in the two different phases have the same length of lever arm. Since the force components in the two phases have the same length of lever arm, it follows that the armature has only a single natural resonant frequency as opposed to prior devices having more than one natural frequency causing flexing of the armature. Electromagnet 1 can be tuned so that it resonates just before closing of the armature or just after closing of the latter. It may be assumed that the value of capacitor C is selected so that the circuit is at or near resonance when the armature is closed. Thus, the equivalent of a much higher voltage holding coil is obtained without a corresponding increase in size and cost, and consequently, the holding power of the electromagnet is correspondingly greater.

I claim:

1. In an alternating current electromagnetic device, in combination, a cylindrical core having a plurality of angularly spaced pole pieces at one end thereof symmetrically arranged around the axis of said core, said pole pieces being defined by a plurality of diametrical slots having parallel sides and intersecting at the axis of said core, a coil surrounding each of said pole pieces and terminating at the free ends thereof, means for energizing a first diametrically opposite pair of said coils with alternating current having a frequency in the range of approximately 180 to 1,000 cycles a second and of a given phase, means for energizing a second diametrically opposite pair of said coils with alternating current of said frequency and having a phase displacement of substantially ninety degrees relative to the phase of said first pair of coils, the last mentioned means comprising a capacitor element in series connection with said second pair of coils, and a cylindrical armature having a substantially planar face opposite said pole pieces for attraction toward the latter under the influence of the magnetic force developed by said coils, said magnetic force having a plurality of force components at the same length of lever arm around the axis of said core affording a balanced pull on the armature throughout the cyclic variations of the alternating current, and said capacitor element having a value of capacitance relative to the inductance of said second pair of coils providing series resonance in the circuit when said armature is closed affording significant differential between the holding current and the closing current flowing through said second pair of coils thereby to provide maximum armature holding power in the closed position of the latter to prevent accidental opening thereof under shock conditions.

2. An alternating current electromagnetic device for efficient operation from a power supply source having a higher than commercial frequency, comprising a cylindrical core having integrally formed therewith a plurality of spaced pole pieces at one end thereof symmetrically arranged around the axis of said core, said pole pieces being defined by a plurality of diametrical grooves having parallel sides across said one end of said core and intersecting at the axis of the latter, a coil surrounding each of said pole pieces substantially flush with the free ends of the latter, an alternating current source having a predetermined voltage and a frequency in the range of 180 to 1,000 cycles a second, means comprising a capacitor element in series circuit with a first pair of said coils for connecting said source to energize a first oppositely disposed pair of said coils with a phase displacement of substantially ninety degrees relative to the phase of a second oppositely disposed pair of said coils, and a cylindrical armature having a substantially planar face opposite said pole pieces for attraction toward the latter under the influence of the magnetic force developed in the air gaps by said coils, said magnetic force having a plurality of force components symmetrically disposed about the common axis of the core and armature to afford a balanced pull on said armature throughout the cyclic variations of the alternating current, and said capacitor element being provided with a value of capacitance affording capacitive reactance substantially equal to the inductive reactance of said first pair of coils in conjunction with the aforesaid voltage and frequency of said source when said armature is closed to cause series resonance in said series circuit, said closure of said armature causing substantially greater current flow through said first pair of coils over the current flowing therethrough when said armature is open thereby to afford maximum armature holding power in the closed position thereof to prevent opening of the armature under severe shock conditions.

References Cited in the file of this patent

UNITED STATES PATENTS

| | | |
|---|---|---|
| 744,773 | Lindquist | Nov. 24, 1903 |
| 2,282,065 | Krautwig | May 5, 1942 |
| 2,469,808 | Aske | May 10, 1949 |
| 2,585,050 | Simon | Feb. 12, 1952 |
| 2,636,156 | Myles | Apr. 21, 1953 |
| 2,878,445 | Scarborough | Mar. 17, 1959 |